A. GANZ.
SWIVEL UNION.
APPLICATION FILED MAY 5, 1921.
1,436,392. Patented Nov. 21, 1922.
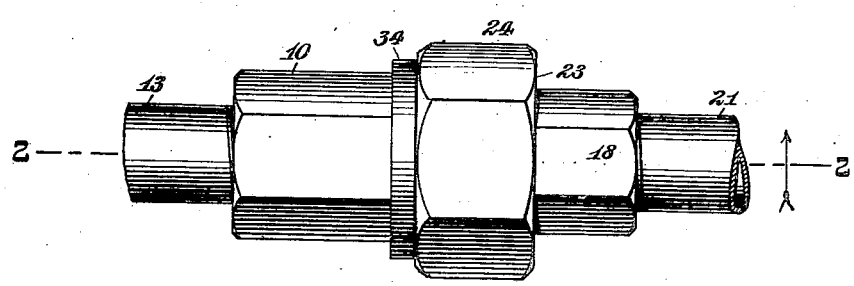
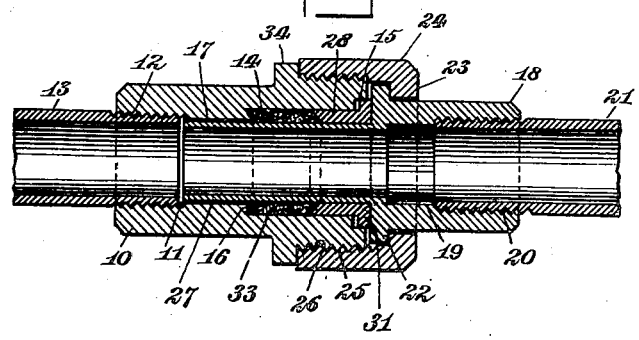
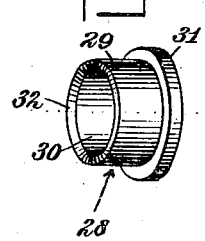 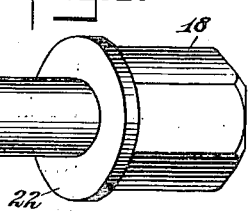
INVENTOR
Adolf Ganz
BY
George Cook + Sons
ATTORNEYS Patented Nov. 21, 1922.

1,436,392

UNITED STATES PATENT OFFICE.

ADOLF GANZ, OF NEW BRIGHTON, NEW YORK.

SWIVEL UNION.

Application filed May 5, 1921. Serial No. 466,945.

*To all whom it may concern:*

Be it known that I, ADOLF GANZ, a citizen of the United States, and a resident of New Brighton, borough of Richmond, in the county of Richmond and State of New York, have made and invented certain new and useful Improvements in Swivel Unions, of which the following is a specification.

My invention relates to a pipe fitting and more particularly to a union wherein one of the coupling members may swivel or turn with respect to the other coupling member so as to constitute what I term a swivel union.

An object of the present invention is to provide an article of the class specified which is simple in construction, economical to manufacture, and so designed and arranged as to effect a tight swivel joint between the two parts of the union or coupling and accordingly will not leak even though used in air or steam pressure lines.

A further object is to accomplish the aforementioned ends and to provide a swivel union wherein the packing or gasket is firmly held between stationary confronting surfaces and which will tightly seal the cylindrical and relatively rotating surfaces of the two coupling members, thus providing for the long and useful life of the packing, and, further, insuring that it will at all times effect a tight seal between the respective parts of the union.

A further object is to provide a swivel union which may be easily and readily secured to the respective ends of the pipes which are to be joined and the packing easily and efficiently inserted in place and the respective members of the union drawn together so as to effect a sealed, though rotatable, joint between the pipe ends.

With the foregoing and other objects in view, which will appear as the description proceeds, my invention resides in the novel swivel union described and in the combination and arrangement of parts and in the details of construction hereafter described and claimed, the preferred embodiment of my invention being disclosed in the accompanying drawings, wherein:

Figure 1 is a view in front elevation of my improved swivel union;

Figure 2 is a view in longitudinal section taken on the line 2—2 of Figure 1;

Figure 3 is a view in perspective of the packing holding member; and

Figure 4 is a view in perspective of the coupling member upon which the packing holding member disclosed in Figure 3 is assembled, and which is secured to the main coupling member by means of the coupling nut.

Referring specifically to the several views, wherein similar reference numerals designate corresponding parts throughout, my improved swivel union is formed with the main coupling member 10 having an opening 11 extending entirely therethrough, the outer extremity of which opening is threaded as at 12 for the reception of a pipe 13. The remote extremity of the main coupling member 10 is provided with the enlarged packing receiving bore 14 which terminates at its outer extremity in the annular recess 15. The inner extremity of the enlarged bore 14 is provided with the bevelled wall 16, the bevelling being outward and toward the free and pipe-receiving end of the coupling member. The opening 11 between the threaded portion 12 and the enlarged packing receiving bore 14 is characterized by the reduced portion 17.

A companion coupling member 18 is adapted to cooperate with the main coupling member and is provided with an opening 19 extending entirely therethrough, the free end of which is threaded as at 20 for the reception of the pipe 21. The companion coupling member is provided with an outstanding flange 22 which is engaged by the overhanging flange 23 of the coupling nut 24. The coupling nut is internally threaded as at 25 and engages the externally threaded inner end 26 of the main coupling member. The companion coupling member 18 is provided with the forwardly extending tube or barrel 27 which is smaller than and projects through the packing receiving bore 14 of the main coupling member and fits nicely within the reduced portion 17 of the bore of the main coupling member.

A packing holding member 28, illustrated in detail in Figure 3, is provided and comprises a body portion 29 having an opening 30 extending therethrough, and with an annular shoulder 31. The opening 30 is adapted to receive the tube or barrel 27 of the companion coupling member therethrough and the body portion 29 is adapted to fit nicely within the packing receiving bore 14 of the main coupling member, while the shoulder 31 is adapted to fit within the annular recess 15 and effect a tight joint therewith. The front extremity of the packing retaining member is bevelled as at 32 so as to force the packing down upon the barrel 27, around which the packing is wound.

With the parts as thus constructed, after the main and companion coupling members have been assembled upon the pipe ends, and the packing retaining member properly positioned upon the barrel of the companion coupling member, the protruding extremity of the barrel 27 is wrapped or wound with a packing and then inserted within the bore of the main coupling member. The coupling nut 24 is then engaged with the threads of the main coupling member and the main and companion coupling members drawn tightly together, with the result that the packing 33 is compressed and accordingly expanded between the external surface of the barrel 27 and the internal surface of the packing receiving bore 14, which accordingly effects a tight seal therebetween. The barrel or tube 27 projects entirely through the packing receiving bore 14 and engages the side walls of the reduced portion 17 of the opening of the main coupling member, so that the companion coupling member is supported at two spaced points and thus held against tilting, although allowed to rotate with respect to the main coupling member. The packing retaining member remains stationary with respect to the main coupling member as the companion coupling member is turned or rotated, so that the packing 33 is held at its ends between confronting stationary surfaces and thus the packing will remain tight and in serviceable condition over a considerable period of time, the turning being between the cylindrical surface and the packing. The outer surfaces of the main and companion coupling members are provided with wrench-engageable portions, illustrated in the present drawings as being of the conventional hexagonal form, whereby these members may be tightly secured to the pipe ends prior to the assembling of the coupling nut 24 thereon. The coupling nut 24 is so designed that when tightly screwed into place it will compress and accordingly expand the packing 33 and, in addition, the extremity of the coupling nut will abut against a shoulder 34 of the main coupling member, which will accordingly tightly and securely lock the coupling nut against becoming accidentally loosened regardless of the amount of swiveling of the companion coupling member 18.

Having thus described and explained my invention, I claim and desire to secure by Letters Patent:

1. A swivel union comprising a main coupling member having an opening extending therethrough, said opening provided with a counterbore extending inwardly from one end thereof and a second and larger counterbore at the free extreme end of the first-mentioned counterbore, a companion coupling member, a forwardly extending tube or barrel carried by said companion coupling member and communicating with the opening which extends therethrough, said tube or barrel engaging the side walls of the bore of the main coupling member to the rear of said counterbore and effecting a tight rotatable joint therewith, a packing holding member rotatably mounted upon the tube of the companion coupling member, provided with a cylindrical body engaging the side walls of the first-mentioned counterbore of the main coupling member and with an annular shoulder fitting within and engaging the side walls of the second-mentioned counterbore of the main coupling member, said packing holding member adapted to rotatably support the companion coupling member, the first-mentioned counterbore of the main coupling member adapted to receive packing therein for engagement by the said packing holding member, and means for drawing the main and companion coupling members together.

2. A swivel union comprising a main coupling member provided with an opening extending therethrough and a companion coupling member having an opening extending therethrough, means for attaching pipes to the outer free extremities of said main and companion coupling members, the inner extremity of the main coupling member provided with a counterbore and with an annular recess at the outer extremity of the counterbore, and the rear wall or shoulder of said counterbore bevelled downwardly toward the companion coupling member, said companion coupling member provided with an elongated tube extending through but not contacting with the side walls of the counterbore and engaging the side walls of the bore of the main coupling member, a packing holding member comprising a cylindrical body rotatably seating upon the tube of the companion coupling member and fitting snugly within the counterbore of the main coupling member, said packing coupling member provided with an annular shoulder fitting within and engaging the side walls of the annular recess of the main coupling member, said packing member adapted to engage the packing located within the counterbore of the main coupling member and, in conjunction with the intermediate portion of the bore of the main coupling member, to support at spaced points the tube of the companion coupling member, and means for drawing and holding the main and companion coupling members together and allowing the relative rotation thereof.

3. A swivel union comprising a main coupling member having a bore extending therethrough and externally threaded at one end for the reception of a coupling nut, said bore enlarging at the one extremity and forming a packing receiving chamber, a companion coupling member having a protruding cylindrical end adapted to extend through the packing receiving chamber of the main coupling member, a packing holding member mounted upon the protruding end of the companion coupling member and adapted to turn with respect thereto, said packing holding member fitting nicely within the said packing chamber and adapted to hold said packing stationary during the swiveling of the coupling members, and a coupling nut engaging the companion coupling member and threadedly engaging the main coupling member and adapted to draw the respective parts of the coupling together.

Signed at New York, borough of Manhattan, in the county of New York and State of New York, this 3rd day of May, A. D. 1921.

ADOLF GANZ.

Witnesses:
R. F. O'Leary,
A. V. Walsh.